(12) United States Patent
Bunel et al.

(10) Patent No.: US 11,808,456 B2
(45) Date of Patent: Nov. 7, 2023

(54) COMBUSTION CHAMBER FOR A TURBOMACHINE

(71) Applicant: SAFRAN AIRCRAFT ENGINES, Paris (FR)

(72) Inventors: Jacques Marcel Arthur Bunel, Moissy-Cramayel (FR); William Louis Rodolphe Dousse, Moissy-Cramayel (FR); Benjamin Frantz Karl Villenave, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/431,254

(22) PCT Filed: Feb. 19, 2020

(86) PCT No.: PCT/FR2020/000037
§ 371 (c)(1),
(2) Date: Aug. 16, 2021

(87) PCT Pub. No.: WO2020/169894
PCT Pub. Date: Aug. 27, 2020

(65) Prior Publication Data
US 2022/0018543 A1    Jan. 20, 2022

(30) Foreign Application Priority Data
Feb. 19, 2019 (FR) .................................. 1901635

(51) Int. Cl.
*F23R 3/28* (2006.01)
*F02C 3/00* (2006.01)
(Continued)

(52) U.S. Cl.
CPC ............. *F23R 3/283* (2013.01); *F02C 3/00* (2013.01); *F23R 3/50* (2013.01); *F23R 3/60* (2013.01);
(Continued)

(58) Field of Classification Search
CPC .. F23R 3/283; F23R 3/002; F23R 3/60; F23R 3/50; F23R 2900/00017; F23R 3/14; F23R 3/286; F02C 7/222
See application file for complete search history.

(56) References Cited

U.S. PATENT DOCUMENTS 3,742,704 A * 7/1973 Adelizzi .................. F23R 3/60
                                                      60/722
4,513,569 A * 4/1985 Sasaki ...................... F23R 3/60
                                                      285/402
(Continued)

FOREIGN PATENT DOCUMENTS

| WO | 2010/000583 A2 | 1/2010 |
| WO | 2015/092206 A1 | 6/2015 |
| WO | 3 042 588 A1   | 4/2017 |

OTHER PUBLICATIONS

International Search Report dated Jul. 28, 2020, issued in corresponding International Application No. PCT/FR2020/000037, filed Feb. 19, 2020, 6 pages.
(Continued)

*Primary Examiner* — Todd E Manahan
*Assistant Examiner* — David P. Olynick
(74) *Attorney, Agent, or Firm* — CHRISTENSEN O'CONNOR JOHNSON KINDNESS PLLC

(57) ABSTRACT

A combustion chamber includes a bottom wall having at least one opening, at least one sleeve mounted upstream of the bottom wall and fixed to the bottom wall, a closing ring defining an annular groove with the sleeve and fixed to the sleeve, and at least one air and fuel injection system having
(Continued)

an axis, mounted in the opening of the bottom wall. The injection system has an annular flange extending radially with respect to the axis and is mounted in the groove with radial clearance. A baffle is situated downstream of the bottom wall and is fixed to the sleeve and/or to the bottom wall.

9 Claims, 5 Drawing Sheets

(51) Int. Cl.
*F23R 3/50* (2006.01)
*F23R 3/60* (2006.01)

(52) U.S. Cl.
CPC ...... *F05D 2220/32* (2013.01); *F05D 2230/60* (2013.01); *F05D 2240/35* (2013.01); *F23R 2900/00017* (2013.01)

(56) References Cited

U.S. PATENT DOCUMENTS

| | | | | |
|---|---|---|---|---|
| 5,996,335 A * | 12/1999 | Ebel | ............. | F23R 3/50 60/800 |
| 6,415,610 B1 * | 7/2002 | Parker | ............. | F23R 3/60 60/798 |
| 7,478,534 B2 * | 1/2009 | Guezengar | ............. | F23R 3/002 60/748 |
| 7,775,051 B2 * | 8/2010 | Hernandez | ............. | F23R 3/60 60/800 |
| 2007/0144180 A1 * | 6/2007 | Nguyen | ............. | F23R 3/54 60/797 |
| 2007/0199329 A1 * | 8/2007 | Hernandez | ............. | F23R 3/60 60/746 |
| 2008/0016874 A1 * | 1/2008 | Markarian | ............. | F23R 3/283 60/740 |
| 2008/0202122 A1 * | 8/2008 | Guezengar | ............. | F23R 3/14 60/722 |
| 2011/0120141 A1 * | 5/2011 | Geary | ............. | F23R 3/50 60/796 |
| 2016/0377292 A1 * | 12/2016 | Prociw | ............. | F23R 3/60 60/753 |
| 2017/0003028 A1 * | 1/2017 | Pireyer | ............. | F23R 3/283 |
| 2017/0176016 A1 * | 6/2017 | Davis, III | ............. | F23R 3/60 |
| 2018/0031245 A1 * | 2/2018 | Kamoi | ............. | F23R 3/60 |
| 2018/0080384 A1 * | 3/2018 | Prociw | ............. | B05B 1/341 |
| 2019/0003711 A1 * | 1/2019 | Reynolds | ............. | F23R 3/14 |
| 2019/0249603 A1 * | 8/2019 | Lee | ............. | F23R 3/283 |
| 2020/0018238 A1 * | 1/2020 | Ryon | ............. | F23R 3/10 |
| 2022/0082259 A1 * | 3/2022 | Bourgois | ............. | F23R 3/14 |

OTHER PUBLICATIONS

Written Opinion dated Jul. 28, 2020, issued in corresponding International Application No. PCT/FR2020/000037, filed Feb. 19, 2020, 7 pages.

English translation of Written Opinion dated Jul. 28, 2020, issued in corresponding International Application No. PCT/FR2020/000037, filed Feb. 19, 2020, 8 pages.

International Preliminary Report on Patentability dated Aug. 10, 2021, issued in corresponding International Application No. PCT/FR2020/000037, filed Feb. 19, 2020, 8 pages.

* cited by examiner

COMBUSTION CHAMBER FOR A TURBOMACHINE

TECHNICAL FIELD OF THE INVENTION

The invention relates to a combustion chamber for a turbomachine, such as an aircraft turbojet engine or a turboprop engine.

PRIOR ART

FIG. 1 shows a part of an annular combustion chamber 1 of a turbomachine such as a turbojet engine or an aircraft turboprop engine, according to the prior art.

The combustion chamber 1 is located at the outlet of a diffuser (not shown), which is itself located at the outlet of a compressor. The chamber 1 consists of an inner revolution wall 2 and an outer revolution wall 3, connected upstream to a chamber bottom wall 4.

The chamber bottom wall 4 has openings 5 for mounting injection systems 6 of a mixture of air and fuel in chamber 1, with air from diffuser and fuel supplied by injectors (not shown) evenly distributed on the circumference of combustion chamber 1. Each injector comprises a fuel injection head aligned with the axis A of the corresponding opening 5.

A portion of the air flow supplied by the compressor and exiting the diffuser feeds internal and external annular ducts bypassing the combustion chamber. The other part of the air flow enters the injection system and is then mixed with the fuel supplied by the injectors before being sprayed into the combustion chamber 1.

For each injection system 6, a central fuel injector is surrounded by an annular wall 7 of said injection system 6 forming a venturi. A bowl 8 surrounds the annular wall, said bowl 8 flaring downstream. The injection system 6 conventionally comprises fins 9 designed to impart a gyration movement to the air flow passing through it, thereby favouring the homogenisation of the air and fuel mixture.

The radially outer periphery of the bowl comprises a radial flange 10 movably mounted in a radial groove 11 delimited by a sleeve 12 welded to the bottom wall 4 of the combustion chamber 1 and by a closing ring 13 welded to the sleeve 12.

The radial displacement of the flange 10 in the groove 11 makes it possible to compensate for the relative displacements between the injectors and the casing of the turbomachine to which they are attached, on the one hand, and the combustion chamber 1, on the other. Such displacements occur during operation due to differential expansion between the various components of the turbomachine.

A baffle 14 is further mounted downstream of the bottom wall 4, the baffle 14 comprising a cylindrical portion 15 mounted within a cylindrical portion 16 of the sleeve 12 and secured by brazing or welding to said cylindrical portion 16 of the sleeve 12.

There is a risk that the baffle 14 may become detached from the sleeve 12, causing damage to downstream components, particularly the turbine.

The invention aims to avoid such damage in a simple, reliable and inexpensive way.

DISCLOSURE OF THE INVENTION

For this purpose, the invention relates to a turbomachine combustion chamber, comprising:
a bottom wall comprising at least one opening,
at least one sleeve mounted upstream of the bottom wall and fixed to the bottom wall,
a closing ring defining an annular groove with the sleeve and fixed to the sleeve,
at least one air and fuel injection system, having an axis, mounted in the opening of the bottom wall, the injection system comprising an annular flange extending radially with respect to said axis, mounted in said groove with a radial clearance,
a baffle situated downstream of the bottom wall, fixed to the sleeve and/or to the bottom wall, comprising a radially internal part situated axially between the bottom wall and a downstream end of the injection system, characterised in that the injection system comprises at least one projecting part capable of being introduced into a recessed part of the baffle, or vice versa, in a first angular mounting position of the injection system with respect to the baffle, said projecting part being capable of coming axially into abutment on a radial face or downstream face of the baffle, or respectively, of the injection system, in a second angular position for holding the injection system with respect to the baffle, said projecting part being angularly offset from the recessed part in said second position.

The baffle and the injection system thus comprise a bayonet-type system allowing the injection system to be mounted in the baffle, in the first angular position, and axially holding the baffle with respect to the injection system, in the second angular position. In the event of separation of the baffle, on the one hand, and of the sleeve and/or the bottom wall, on the other hand, the baffle remains held axially by the projecting part so that there is no risk of damage to downstream components of the turbomachine.

The terms "upstream" and "downstream" are defined with respect to the gas flows through the turbomachine.

The terms "radial", "axial" and "circumferential" are defined with respect to the axis of the injection system.

The combustion chamber may include position-holding means adapted to hold the injection system in its second position relative to the baffle.

The projecting part may extend radially from the downstream end of the injection system, the recessed part being formed in the baffle.

The projecting part is for example formed by a radially outwardly extending lug or tab. The recessed part is formed, for example, by a groove or notch in the baffle.

The number of projecting parts and recessed parts is, for example, three. The projecting and recessed parts can be evenly distributed around the circumference.

The injection system may comprise a rotation blocking lug held or immobilized in rotation by circumferential stops of the sleeve and/or the closing ring.

The sleeve may comprise a first circumferential stop and a second circumferential stop, the rotation blocking lug being adapted to abut the first circumferential stop in the first angular position of the injection system, the rotation blocking lug being adapted to abut the second circumferential stop in the second angular position of the injection system.

The circumferential stops thus form end stops, allowing and limiting the angular deflection of the injection system in relation to the baffle. Such a structure allows to facilitate the mounting of the assembly.

The closing ring may comprise a third circumferential stop, the lug being adapted to be held in position between the second and third circumferential stops, so as to maintain the injection system in its second angular position.

The second and third circumferential stops thus form the aforementioned position-holding means, together with the position-holding lug.

The sleeve may comprise a radially inner cylindrical portion mounted in the opening in the bottom wall and attached to the periphery of said opening.

The corresponding fastening is done, for example, by soldering or welding.

The baffle may comprise a cylindrical portion mounted in the radially inner cylindrical portion of the sleeve and attached to said radially inner cylindrical portion.

The corresponding fastening is done, for example, by soldering or welding.

The sleeve may comprise a radially outer cylindrical portion located axially upstream of the radially inner cylindrical portion, the closing ring being mounted radially within the radially outer cylindrical portion.

The combustion chamber may comprise an injector having an injection head mounted in the injection system, the injection system comprising means for supplying air and means for forming a mixture of the air with the fuel from the injector.

The invention also relates to a turbomachine for an aircraft comprising an assembly of the aforementioned type.

The invention also relates to a method for assembling a combustion chamber of the above-mentioned type, characterised in that it includes the following steps:

fixing the sleeve and the baffle to the bottom wall, positioning the injection system in the first angular position and introducing the injection system into the opening in the bottom wall, through the sleeve and the baffle, by translation along the axis of the injection system and of said opening, the projecting part passing through the recessed part pivoting the injection system into its second angular position so that the projecting part is capable of forming an axial stop with the baffle, mounting the closing ring so as to hold the annular flange of the injection system axially in the groove delimited by the closing ring and the sleeve and immobilise the injection system against rotation.

DETAILED DESCRIPTION OF THE INVENTION

Figure 1:
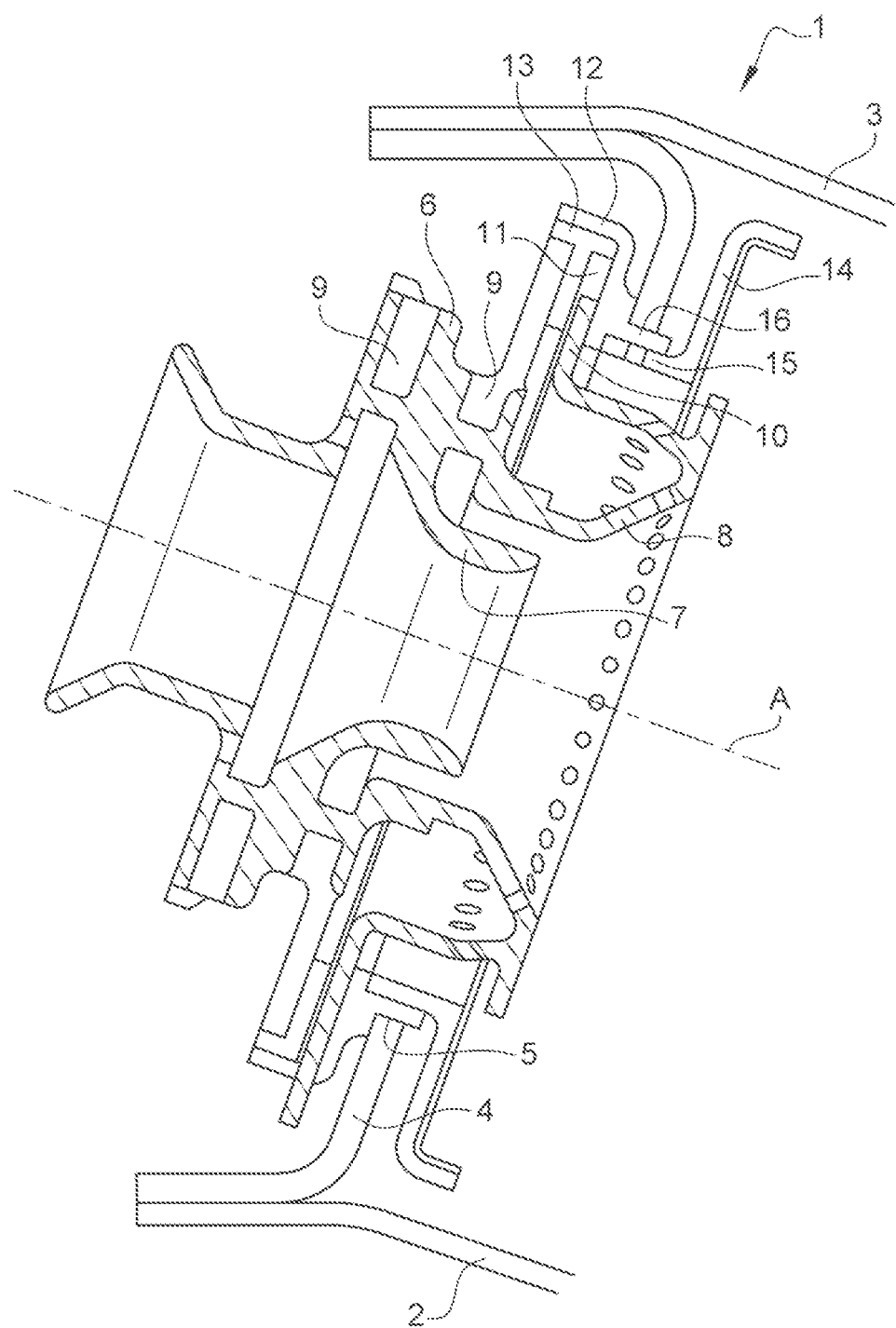
FIG. 1 is an axial cross-sectional view of a portion of a combustion chamber of the prior art.
Figure 2:
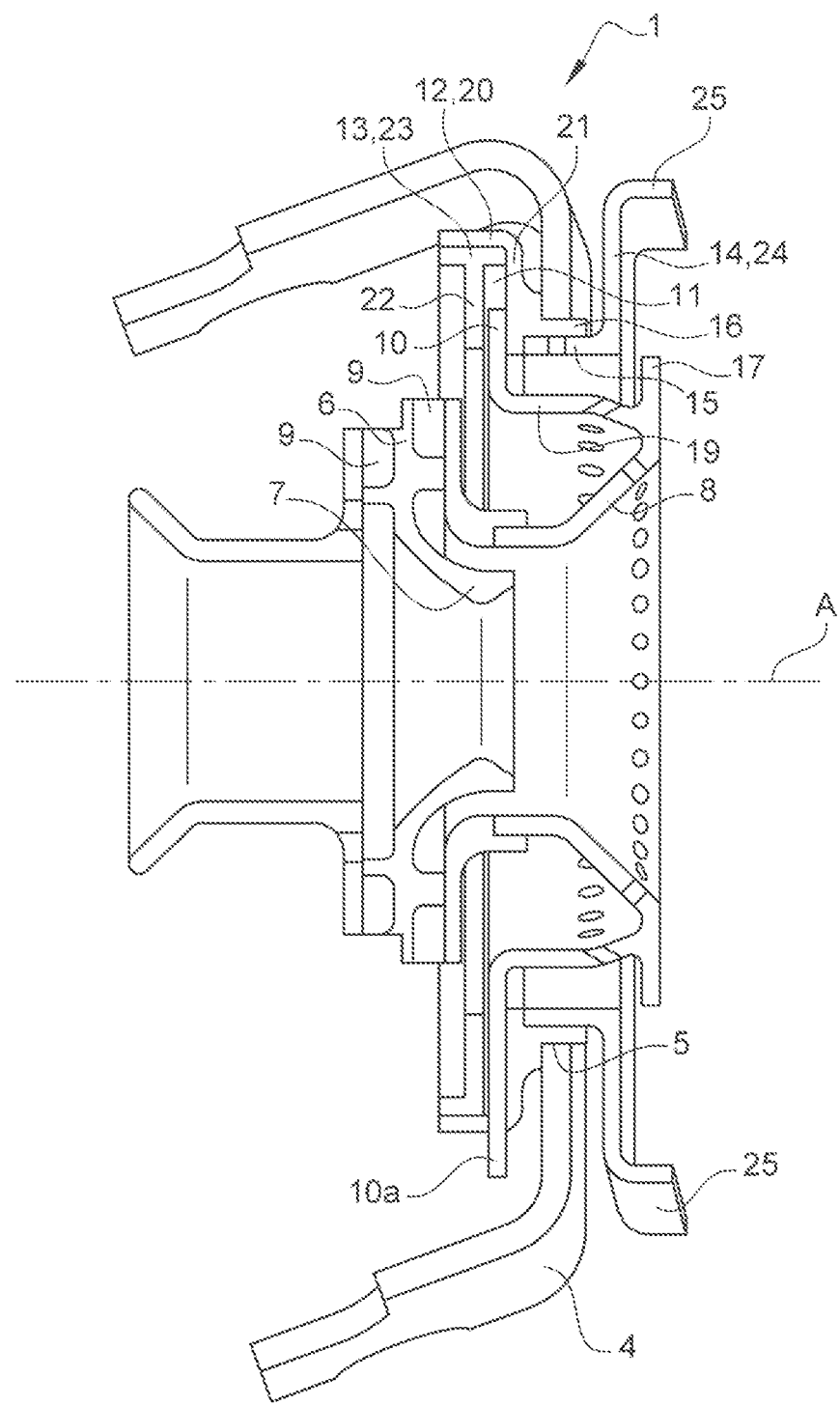
FIG. 2 is a view corresponding to FIG. 1, illustrating a combustion chamber according to an embodiment of the invention.

FIGS. 2 to 8 illustrate part of a combustion chamber 1 according to one embodiment of the invention, intended to equip a turbomachine, such as a turbojet engine or an aircraft turboprop.

The chamber 1 consists of an inner revolution wall and an outer revolution wall, connected upstream to a chamber bottom annular wall 4.

The chamber bottom wall 4 has openings 5 for mounting injection systems 6 of a mixture of air and fuel in chamber 1, with air from diffuser and fuel supplied by injectors (not shown) evenly distributed on the circumference of combustion chamber 1. Each injector comprises a fuel injection head aligned with the axis A of the corresponding opening 5.

A portion of the air flow supplied by the compressor and exiting the diffuser feeds internal and external annular ducts bypassing the combustion chamber. The other part of the air flow enters the injection system and is then mixed with the fuel supplied by the injectors before being sprayed into the combustion chamber 1.

For each injection system 6, a central fuel injector is surrounded by an annular wall 7 of said injection system 6 forming a venturi. A bowl 8 surrounds the annular wall, said bowl 8 flaring downstream.

Figure 3:
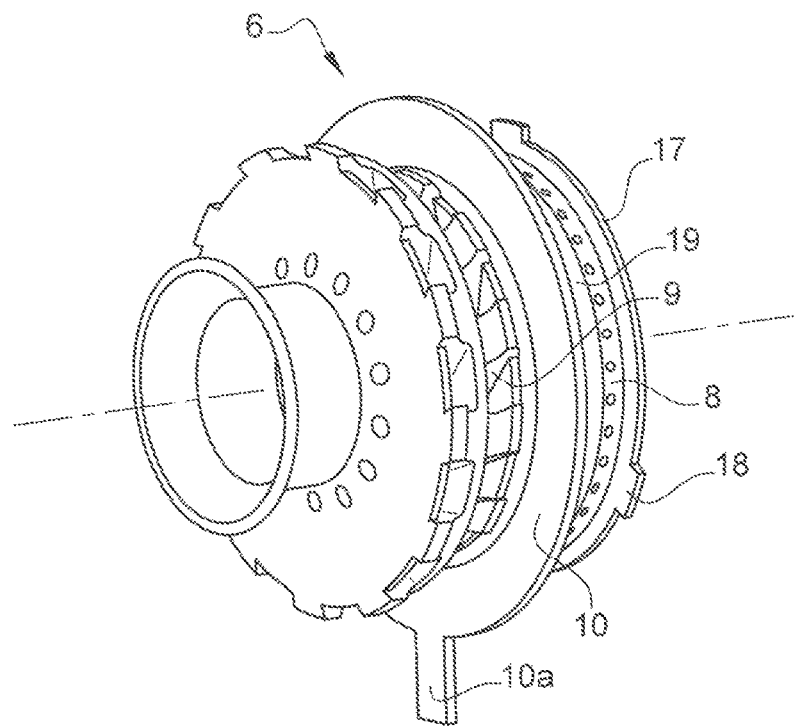
FIG. 3 is a perspective view of the injection system.
Figure 4:
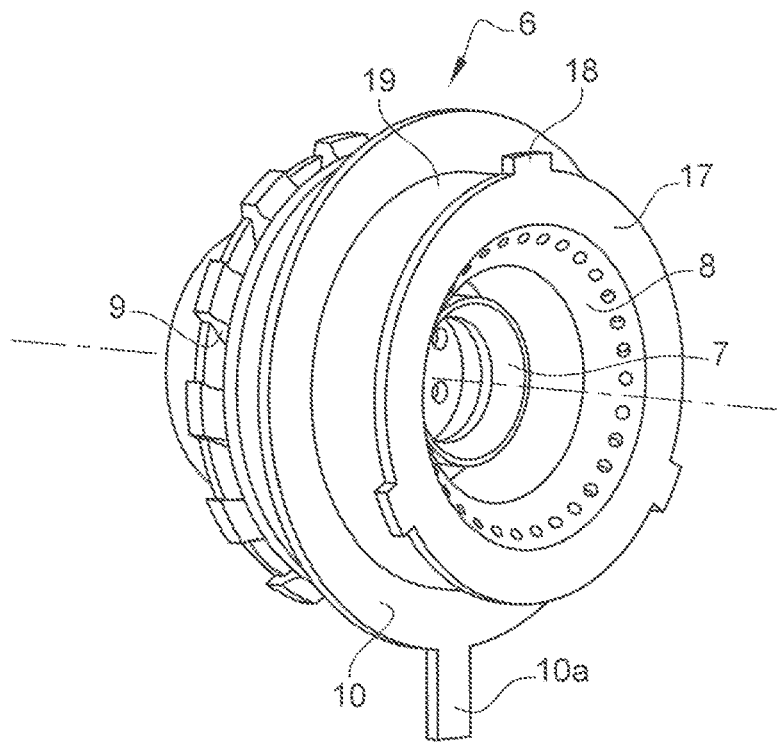
FIG. 4 is a perspective view of the injection system.
Figure 5:
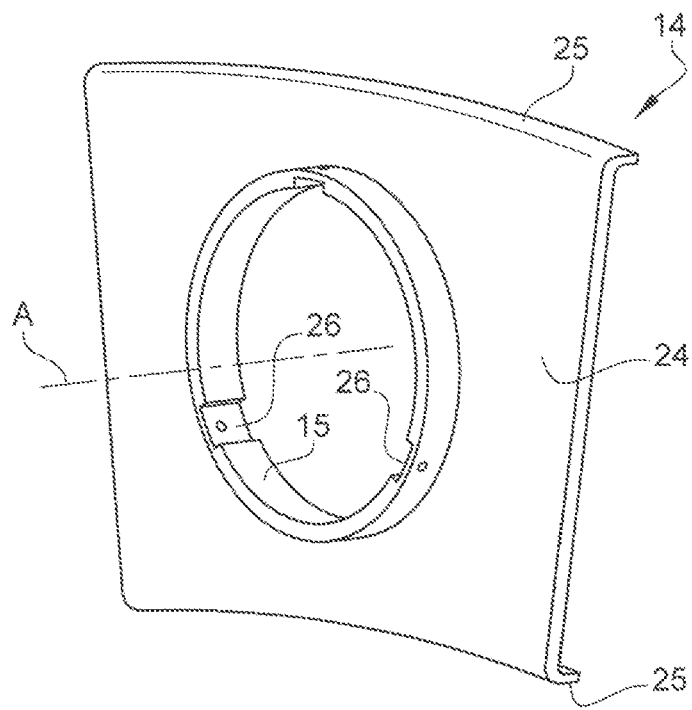
FIG. 5 is a perspective view of the baffle.

The downstream end of the bowl 8 comprises an annular flange 17 which extends radially outwards. As best seen in FIGS. 3 and 4, lugs or tabs 18 extend radially outwardly from the radially outer periphery of the annular flange 17. There are three lugs in this case and they are evenly distributed around the circumference, i.e. they are angularly offset from each other by an angle of 120°.

The injection system 6 also conventionally comprises fins 9 designed to impart to the air flow entering through the channel defined between the bowl 8 and the annular wall a gyration movement favouring the homogenisation of the air and fuel mixture.

The radially outer periphery of the bowl has a radial flange 10 connected to the flange 17 by a cylindrical portion 19. The flange 10 is located axially upstream of the flange 17. The flange 10 is movably mounted in a radial groove 11 delimited by a sleeve 12 welded to the bottom wall 4 of the combustion chamber 1 and by a closing ring 13 welded to the sleeve 12. The flange 10 has a tab 10a extending radially outwardly from the radially outer end of the flange 10.

The radial displacement of the flange 10 in the groove 11 makes it possible to compensate for the relative displacements between the injectors and the casing of the turbomachine to which they are attached, on the one hand, and the combustion chamber 1, on the other. Such displacements occur during operation due to differential expansion between the various components of the turbomachine.

More particularly, the sleeve 12 comprises, from upstream to downstream, a cylindrical portion 20, a radially extending annular portion 21 and a cylindrical portion 16. The cylindrical portion 20 has a larger diameter than the cylindrical portion 16. The cylindrical portion 16 is mounted in the opening 5 of the bottom wall and is fixed to said bottom wall 4 by welding or brazing. The radially inner area of the radial part 21 has a downstream support surface which rests on the bottom wall 4.

The cylindrical portion 20 extends over only part of the circumference. In particular, the sleeve has an angular sector without a cylindrical portion 20, as can be better seen in FIG. 7, this angular sector here extends over 120°. The circumferential ends 20a, 20b of the cylindrical portion 20 are adapted to form stops for the tab 10a which is housed in said angular sector without cylindrical portion 20.

The closing ring 13 is generally T-shaped in cross-section, having an annular radial portion 22 and an annular cylindrical portion 23. The downstream end of the cylindrical portion 23 rests on the radial portion 21 of the sleeve 12.

Said radial part 21 of the sleeve 12 and the radial part 22 of the closing ring 23 are thus axially spaced from each other and define the groove 11 between them.

The downstream end of the cylindrical portion 23 has a notch 23a (FIG. 8), whose function is explained below.

A baffle 14 is also mounted downstream of the bottom wall 4.

The baffle 14 comprises, from upstream to downstream, a cylindrical portion 15, a radial portion 24 having a sector of a ring shape, and flanges 25 extending axially downstream at the radially inner and outer edges of the radial portion 24. The cylindrical portion 15 is mounted within the cylindrical portion 16 of the sleeve 12 and secured by brazing or welding to said cylindrical portion 16.

The cylindrical portion 16 also has grooves 26, here three, evenly distributed around the circumference.

Such a combustion chamber is mounted as described hereunder.

The sleeve 12, in particular the cylindrical portion 16, is first mounted in the opening 5 of the bottom wall 4. The baffle 14, in particular the cylindrical portion 15, is mounted in the cylindrical portion 16 of the sleeve. The cylindrical portion 16, the cylindrical portion 15 and the bottom wall are then joined to each other by welding or brazing.

The injection system is then mounted in the opening 5 of the bottom wall, through the sleeve 12 and the baffle 14. In particular, the injection system is positioned in a first angular position so that the lugs 18 of the injection system 6 are located opposite the grooves 26 of the baffle 14. The injection system is then moved downstream by translation until the flange 10 rests on the radial part 21 of the sleeve. The lugs 18 are then located just downstream of the radial portion 24 of the baffle and the tab 10a is housed in the area of the sleeve 12 without the cylindrical flange 20.

Figure 6:
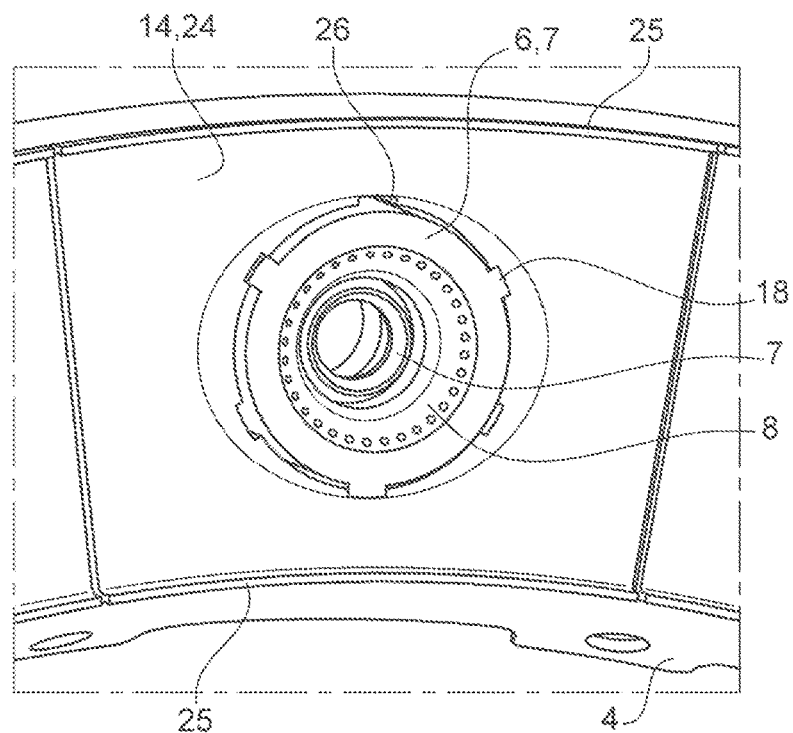
FIG. 6 is a perspective view of a part of the combustion chamber according to the invention, the injection system being in its second angular position with respect to the baffle.
Figure 7:
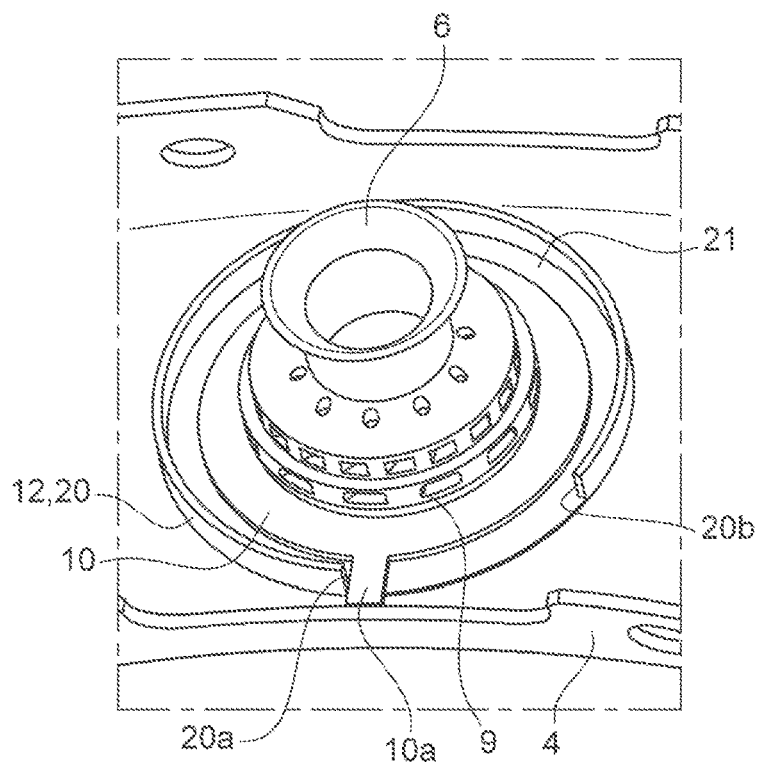
FIG. 7 is a perspective view showing the sleeve, the chamber bottom and the injection system, in the second angular position of the injection system.
Figure 8:
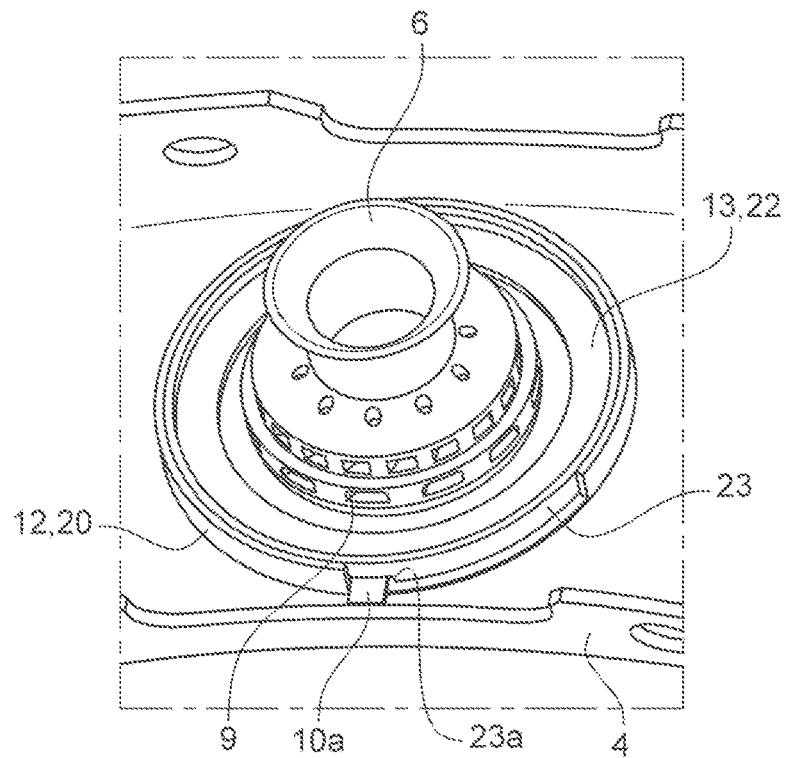
FIG. 8 is a view corresponding to FIG. 7, in which the closing ring has been added.

The injection system 16 is then rotated to a second angular position, illustrated in FIGS. 6 to 8. In particular, the injection system is rotated through an angle of 60° between the first and second angular positions, this angle corresponding to half the angular distance between two grooves 26 or between two lugs 18.

In the second angular position, the tab 10a of the injection system 6 comes to rest on the circumferential stop 20a, so as to facilitate assembly.

In the second angular position, the lugs 18 are offset from the grooves 26 and are capable of coming to rest on the radial part 24 of the baffle 14, so as to prevent axial displacement of the injection system 6.

The closing ring 13 is mounted in the cylindrical portion 20 of the sleeve 10, so that the tab 10a is received and held in position in the notch 23a. The closing ring 13 is then attached to the sleeve 12 by welding or brazing. The injection system 6 is thus prevented from rotating.

Such a structure ensures simple assembly of the assembly while preventing the removal of the baffle 14 in the event that the cylindrical portion 15 is debrazed or unsoldered. This prevents damage to the parts of the turbomachine that are located downstream of the bottom wall 4 or the combustion chamber 1.

The invention claimed is:

1. A combustion chamber for a turbomachine, comprising:
    a bottom wall comprising at least one opening extending therethrough,
    at least one sleeve mounted upstream of the bottom wall and fixed to the bottom wall, the sleeve having a cylindrical portion and a radially extending annular portion, a closing ring having a cylindrical portion and radial portion, wherein the cylindrical portion of the closing ring fits radially within the cylindrical portion of the sleeve and a downstream end of the cylindrical portion of the closing ring rests against the radially extending annular portion of the sleeve such that an annular groove is defined by the cylindrical and the radial portions of the closing ring and the radially extending annular portion of the sleeve,
    at least one air and fuel injection system, having an axis, mounted in the opening of the bottom wall, the injection system comprising an annular flange extending radially with respect to said axis, mounted in said annular groove with a radial clearance,
    a baffle situated downstream of the bottom wall, fixed to the sleeve and/or to the bottom wall, comprising a radially internal part situated axially between the bottom wall and a downstream end of the injection system,
    wherein the injection system comprises at least one projecting part extending radially and configured to be introduced into one of a recessed part of the baffle and a first angular mounting position of the injection system with respect to the baffle, said projecting part being configured to come axially into abutment against a radial face or a downstream face of the baffle, or respectively, of the injection system, in a second angular position for holding the injection system with respect to the baffle, said projecting part being angularly offset from the recessed part in said second angular position, the injection system further comprising a rotation blocking lug extending from the annular flange and through a gap in the cylindrical portion of the sleeve such that the rotation blocking lug is immobilized in rotation by circumferential stops of the sleeve.

2. The combustion chamber according to claim 1, further comprising position-holding means configured to hold the injection system in the second angular position with respect to the baffle.

3. The combustion chamber according to claim 1, wherein the projecting part extends radially from the downstream end of the injection system, the recessed part being formed in the baffle.

4. The combustion chamber according to claim 1, wherein the sleeve comprises a first circumferential stop and a second circumferential stop, the rotation blocking lug being configured to come to rest on the first circumferential stop in the first angular position of the injection system, the rotation blocking lug being configured to come to rest on the second circumferential stop in the second angular position of the injection system.

5. The combustion chamber according to claim 1, wherein the closing ring comprises a third circumferential stop, the lug being configured to be held in position between the second and third circumferential stops to hold the injection system in the second angular position.

6. The combustion chamber according to claim 1, wherein the sleeve comprises a radially inner cylindrical portion mounted in the opening of the bottom wall and fixed to a periphery of said opening.

7. The combustion chamber according to claim 6, the baffle comprises a cylindrical portion mounted in the radially inner cylindrical portion of the sleeve and fixed to said radially inner cylindrical portion.

8. The combustion chamber according to claim 1, wherein the sleeve comprises a radially external cylindrical portion situated axially upstream of the radially internal cylindrical portion, the closing ring being mounted radially inside the radially external cylindrical portion.

9. A method for assembling a combustion chamber according to claim 1, comprising the following steps:
- fixing the sleeve and the baffle to the bottom wall,
- positioning the injection system in the first angular position and introducing the injection system into the opening in the bottom wall through the sleeve and the baffle by translation along the axis of the injection system and said opening, the projecting part crossing the recessed part,
- pivoting the injection system in the second angular position so that the projecting part is positioned to form an axial stop with the baffle, and
- mounting the closing ring to hold the annular flange of the injection system in the groove delimited by the closing ring and the sleeve.

* * * * *